United States Patent [19]

Kalafus et al.

[11] 4,236,564

[45] Dec. 2, 1980

[54] RUBBER-FREE PHENOL-FORMALDEHYDE ADHESIVE FOR BONDING BRIGHT STEEL TO RUBBER

[75] Inventors: Edward F. Kalafus, Akron; Satish C. Sharma, Mogadore, both of Ohio

[73] Assignee: The General Tire & Rubber Company, Akron, Ohio

[21] Appl. No.: 37,604

[22] Filed: May 10, 1979

[51] Int. Cl.³ .................. B60C 1/00; C08L 61/06; B29H 17/00
[52] U.S. Cl. .................. 152/359; 156/110 A; 156/335; 260/29.3; 525/501
[58] Field of Search ............. 152/330 R, 356, 357 R, 152/359; 156/110 A, 110 C, 110 MD, 335; 260/29.3; 525/501

[56] References Cited

U.S. PATENT DOCUMENTS

| | | | |
|---|---|---|---|
| 3,857,726 | 12/1974 | Van Gils | 156/335 |
| 4,011,899 | 3/1977 | Chamberlin | 152/359 |
| 4,040,999 | 8/1977 | Kalafus et al. | 156/110 A |
| 4,167,500 | 9/1979 | Jazenski et al. | 260/29.3 |

Primary Examiner—John T. Goolkasian
Assistant Examiner—Lois E. Rodgers

[57] ABSTRACT

A rubber-free heat reactable phenol-formaldehyde resin adhesive is used to bond bright steel tire cords to the tire rubber.

1 Claim, No Drawings

RUBBER-FREE PHENOL-FORMALDEHYDE ADHESIVE FOR BONDING BRIGHT STEEL TO RUBBER

The invention relates to adhesives for bonding of bright steel to rubber.

Steel is one of the preferred reinforcing materials for tires. Almost universally, the steel cords used in tires are brass-plated. The primary function of brass-plating is to provide good bonding between steel and rubber. It (brass) also acts as a processing aid (lubricant) during the drawing of steel wire. Steel cords can, however, be made without the use of brass as lubricant.

A significant problem in the use of brass-plated steel wire in tires is the loss of adhesion (between steel and rubber) with time. This limits the ultimate useful lifetime of the reinforcement and hence, of the tires. The problem is especially acute in truck tires where long service life is required. Reduction in the rate of loss of adhesion with time should extend the useful lifetime of steel reinforced tires, and thus result in an improved product.

It has been found that the loss of adhesion between steel and rubber in tires is accompanied by degradation of the brass coating. This problem in the tire industry is commonly referred to as the "corrosion" of steel wire. This adhesion loss is further hastened by the presence of moisture, oxygen and some rubber stock ingredients.

Some attempts to solve the problem of "corrosion" of brass-plated steel tire cords has been made in the past by the manufacturers of the brass-plated steel cord. The manufacturers, however, closely guard their secrets.

U.S. Pat. Nos. 3,857,726 and 4,011,899 disclose that mixtures of an organic elastomeric coating (1) resorcinol formaldehyde resins or (2) a bis(2,4 dihydroxy phenylmethyl) chlorophenolic resin substantially reduce the problem of bright steel "corrosion" and adhesion loss.

The invention as claimed solves the problem of adhesion retention in the bonding of steel surfaces to rubber compounds presently in use. This application describes the effects of various parameters of the system such as composition of the phenolic resin adhesive, carrier solvent, processing conditions and base level on the adhesive quality of the system. Bright and chemically treated steel, when coated with an appropriate phenolic resin adhesive can dramatically outperform the corresponding brass-plated steel in bonding to rubber.

The composition and method of this invention are useful for bonding a bright steel surface to natural rubber and synthetic replacements therefor. By "steel" is meant a malleable alloy of iron and carbon, usually containing substantial quantities of manganese. By "alloy" is meant steel that owes its distinctive properties chiefly to some element or elements other than carbon or jointly to such other elements and carbon. Some of the alloy steels necessarily contain an important percentage of carbon, even as much as 1.25%. Stainless steel is an example of an alloy. It should be noted however, that there is no agreement as to where the line between alloy steels and steel is customarily drawn.

The term "rubber" includes natural and synthetic rubber.

The term "natural rubber" means rubber obtained from botanical sources, primarily from the hevea brasiliensis tree and also from other trees such as ficus elastica; from shrubs, such as parthenium-argentatum; and vines such as landolphia. By the term "synthetic replacements" is meant synthetic replacements for natural rubber such as polyisoprene, polybutadiene, emulsion polymerized styrene-butadiene copolymers, solution polymerized styrene-butadiene copolymers, and styrene-butadiene rubbers made by the "Alfin" process which is a polymerization catalyzed chiefly by a mixture of allyl-sodium, sodium isopropoxide, and sodium chloride. Of course, mixtures of any of these above stated materials would also qualify as "synthetic replacements" for natural rubber.

Steel and alloy steels are used in tire construction such as in tire belts, tire beads and tire carcass plies.

By "bright" is meant as aforesaid, that the steel is not brass-plated but may be treated to prevent or at least reduce corrosion such as by phosphatizing, chromic acid soaking, or nitrate treatment, etc., where required. That is, some steels are highly corrosion resistant without extra treatment; in these cases no treatment is needed. In addition, bright steels and alloy steels are generally sandblasted and pickled in acids to remove traces of foreign matter. The steel or alloy steel may be used in a variety of sizes and shapes such as cords, ribbon wire and braided steel wire, monofilaments, curled monofilaments and other configurations. Particularly important, however, are steel wires, ribbons and cords useful as reinforcement in the carcass of pneumatic tires. Among these tire cord steels is the type known as "Bekaert" steel tire cord made by the Bekaert Steel Corporation.

While the phenol formaldehyde coated bright steel reinforcing elements of this invention can be adhered to a vulcanizable blend of natural rubber, polybutadiene rubber, and rubbery butadiene-styrene copolymer by curing the same in combination together, it is apparent that said adhesive-containing bright steel reinforcing element can be adhered to other vulcanizable rubbery materials, by curing or vulcanizing the same in combination with the rubber, such as one or more of the foregoing rubbers as well as nitrile rubbers, chloroprene rubbers, polyisoprenes, vinyl pyridine rubbers, acrylic rubbers, isopreneacrylonitrile rubbers and the like and mixtures of the same. These rubbers prior to curing, can be mixed with the usual compounding ingredients including sulfur, stearic acid, zinc oxide, magnesium oxide, accelerators, antioxidants, antiozonants and other curatives and the like well known to those skilled in the art for the particular rubbers being employed. A heat reactive phenolic resin is preferably also present in the rubber.

Phenolic resins of the present invention include any of the known heat reactive phenolic resins optionally in combination with coreactive nonheat reactive phenolic resins. Examples of heat reactive resins include those that can be used in conjunction with a latex as a cord dip for synthetic organic tire cords. Also included are those that are incompatible with latex. Examples of phenolic resins include all known resoles. More specific examples include:

Phenacolite R-2170: Resorcinol-formaldehyde novolak resin (75% solids, pH-0.5-1.5 R/F mole ratio=2/1), Koppers Co., Inc. used in combination with formaldehyde in a basic media. This is an example of a nonheat reactive resin which becomes a heat reactive resin upon the addition of formaldehyde.

Phenol-formaldehyde resins: Heat reactive, prepared in accordance with the teachings of U.S. Pat. No. 4,040,999.

H-7 resin: p-chlorophenol-formaldehyde-resorcinol resin, 20% solids in aqueous NH$_4$OH, ICI America, Inc.

Arofene 7209: Resorcinol-formaldehyde heat reactive resin (100% solids), Ashland Chemical Company.

CKM 1634: p(t-butyl)phenol-formaldehyde heat reactive resin (100% solids), Union Carbide Corporation.

BKRA 2620: Phenol-formaldehyde heat reactive resin (100% solids), Union Carbide Corporation.

Cohedur RL: Equal parts of resorcinol and hexamethylol melamine pentamethyl ether with a small amount of dibutyl phthalate for viscosity control.

Both organic solvents and water can be used as solvents. When using water as solvent, it was usually necessary to add some base (NaOH) in order to keep the resins in solution. The preferred solvents are the organic solvents, particularly n-propanol.

The phenolic resins of the present invention are heat reactive resins containing methylol groups formed by the reaction of a phenolic compound with formaldehyde in a basic media.

The steel wires used in the following specific examples were obtained from two sources. The bulk of the work was performed with 7×3×0.15 mm construction bright steel wire obtained from Bekaert Steel Wire Corporation. A 1×5×0.25 mm construction bright steel wire obtained from Tokyo Steel Cord Company, Ltd., was also used. Brass-plated, galvanized, and Bonderized wires of 7×3×0.15 mm construction used were obtained from Bekaert Steel Wire Corporation.

The resins used were generally diluted with appropriate solvent before mixing together (when using more than one resin). The dips were aged at least one hour before use. Most dips were prepared at 10% solids and used as such.

All cord processing was done on a conventional dipping unit. The oven temperature ranged between 90°–225° C. The temperature was monitored at three points along the oven (two ends and the middle) and is reported as such. Processing times varied between 15–180 seconds, giving cord processing rates of 0.7–10 meters/minute.

A wire pull-out adhesion test was used (F-1615). There is a corresponding ASTM test. In this test wire is embedded in 15.9 mm (5/8") rubber backed with metal strips to reduce rubber deformation. Eight or sixteen pulls were generally averaged to give the adhesion values reported. The adhesion values were measured on an Instron at a crosshead speed of 12.7 cm (5") per minute.

For the preparation of strip adhesion samples, the wires were wound on a drum 16 ends/25.4 mm and a 1.14 mm (0.045 in.) thick rubber sheet was rolled on top. The assembly was then removed from the drum and 25.4 mm×127 mm (1"×5") strips were cut parallel to the long direction of the wires. Two ~0.51 mm (0.020 in.) rubber strips were placed between two of the wire strips (facing the exposed wire) and cured. The samples were pulled on an Instron at a crosshead speed of 50.8 mm (2 in.) per minute. This test was used only once because of the laborious sample preparation procedure and a large amount of wire required for each test.

Two sets of curing conditions were used for adhesion samples. During the initial part of the work, the curing conditions used were 158° C. for 30 minutes. For the rest of the work, a curing condition of 153° C. for 35 minutes was used.

All unaged adhesion samples were stored at room temperature for at least 16 hours before testing.

To evaluate the effect of humid aging on adhesion, the adhesion samples were placed in a cylinder containing 100 ml of deionized water. The cylinder was then purged with nitrogen and sealed. Humid aging was carried out by placing the cylinder in an oven maintained at 120° C. (250° F.). After the desired aging period, the samples were removed from the cylinder, allowed to equilibrate to room temperature (approximately 1 hour) and tested for adhesion as mentioned above.

The equipment used for the flex test was the Chrysler Flexometer. This equipment is normally used for flex testing of plastics. It consists basically of two vertically mounted metal plates, one of which is held relatively stationary (mounted with springs) while the other moves back and forth at a frequency of approximately 2,500 cycles per hour. The maximum separation between the far ends of the plates during the test was 70 mm and the minimum separation was 12.5 mm (the plates are 6.25 mm thick).

The test procedure was as follows. Wires to be flex tested were cut to 180–200 mm lengths and taped to the far ends of the flexometer plates such that the length of the wires between the taped portions was ~75 mm each.

After flexing for the desired number of cycles (or times), the wires were removed from the flexometer and the central 15.9 mm (5/8") of each wire was embedded in rubber stock V- for adhesion testing in the manner described above. Since the center of the wire experiences the largest effect in this flex test, it is felt that this procedure for adhesion sample preparation will evaluate the maximum effect on adhesion for each set of flexing conditions.

A few runs were performed with phenolic resins sold in lump form but the bulk of the work centered around Penacolite R-2170 and phenol-formaldehyde resins prepared according to U.S. Pat. No. 4,040,999. It should be understood that commercial resole phenolic resins should perform just as well when properly compounded.

The formulas of the rubber stocks B- and V- used to determine the effectiveness of the phenolic cord dips on bright steel are as follows:

| Formulation B- | |
|---|---|
| Natural rubber, milled with 0.3 phr Endor peptizer (zinc salt of pentachlorothiophenol) | 100.0 |
| N-330 (HAF) high abrasion furnace black, small particle size | 30.0* |
| Zinc oxide | 10.0 |
| Stearic acid | 1.5 |
| Santoflex 13 N-(dimethyl butyl)-N'-phenyl paraphenylene diamine | 2.0 |
| HiSil (hydrated precipitated silica dioxide | 15.0 |
| Sulfur (insoluable) | 3.75 |
| Vulkacit DZ (N-dicyclohexyl benzothiazyl sulfenamide | 1.30 |
| Cohedur RL which is composed of equal parts of resorcinol and hexamethylol melamine pentamethyl ether with a small amount of dibutyl phthalate for viscosity control | 4.60 |
| Formulation V- | |
| Natural rubber | 46.5 |
| Milled with Endor | 0.14 |
| SBR 1500 Polybutadiene containing 23% styrene and a rosin acid emulsifier | 38.5 |
| Polybutadiene | 15.0 |
| FEF (fast extrusion furnace black), small particle size | 45.0 |

-continued

| | |
|---|---|
| Zinc oxide | 3.0 |
| BLE antioxidant, reaction product of diphenylamine and acetone | 2.0 |
| Stearic acid | 1.5 |
| High aromatic oil | 5.0 |
| Santocure NS - N-tert butyl-benzothiazole 2-sulfenamide | 1.2 |
| HiSil (hydrated precipitated silica dioxide | 15.0 |
| Sulfur (insoluble) | 3.00 |
| Cohedur RL which is composed of equal parts of resorcinol and hexamethylol melamine pentamethyl ether with a small amount of dibutyl phthalate for viscosity control | 4.7 |

*All parts are phr, parts per hundred parts rubber by weight.

EFFECT OF PHENOL-FORMALDEHYDE RESIN/PENACOLITE R-2170 RATIO

The dip recipes, particulars of phenol-formaldehyde resin, cord processing conditions, the adhesion data and stock formulations are given in Table I.

TABLE I

Effect of Phenol-Formaldehyde/Penacolite R-2170 On Wire Pull-Out Adhesion

Adhesion (Newtons) at 25° C.; F-1615 Test

| Phenol-Formaldehyde*/Penacolite | | | | | Brass-Plated |
|---|---|---|---|---|---|
| Stock | Humid Aging Conditions | 3:1 | 3:2 | 2:3 | 1:3 | (Control) |
| B- | None | 759 | 726 | 678+ | 759+ | 689 |
| B- | 121° C./N$_2$ + H$_2$O/16 hrs. | 571 | 607 | 695+ | 693+ | 328 |
| B- | 121° C./N$_2$ + H$_2$O/48 hrs. | — | — | 548≠ | 711 | 215 |
| B- | 121° C./N$_2$ + H$_2$O/168 hrs. | — | — | 514 | 675 | — |
| V- | None | 827 | 833 | 841+ | 823+ | 772 |
| V- | 121° C./N$_2$ + H$_2$O/16 hrs. | 593 | 646 | 711+ | 760+ | 245 |
| V- | 121° C./N$_2$ + H$_2$O/48 hrs. | — | — | 626 | 614+ | 83 |
| V- | 121° C./N$_2$ + H$_2$O/168 hrs. | — | — | 383 | 627 | — |

*Phenol/formaldehyde/NaOH mole ratio was 1:3:.075. Reacted at 70° C. for 3 hours. Stored at ~5° C. after preparation.
+Average of two different tests.
≠During adhesion testing, the metal backing strip detached causing some values to be low. The actual adhesion values are likely to be higher than these values.

Solvent: n-propanol was used as solvent in these adhesives. However, since the phenol-formaldehyde resin was a 45% water solution and Penacolite R-2170 was added from a 40% water solution, some water was present in all these dips.
Dip Solids: 10%
Cord Processing Conditions: 140°–155°–175° C., 2 minutes
Stock Curing Conditions: 158° C., 30 minutes
Wire: 7×3×0.15 mm bright steel wire The data show that the bright steel wires dipped in these adhesive compositions perform better in both B- and V- rubber stocks than the corresponding brass-plated wire. All the adhesive coated wires show a dramatic improvement over the brass-plated wires in adhesion retention after humid aging. It is seen from the data in Table I that after humid aging for 16 hours, the brass-plated wire showed adhesion losses of 52% and 68%, respectively, in B- and V- stock. The corresponding adhesion losses with wires coated with the best adhesive composition (phenol-formaldehyde/Penacolite ratio of 1:3) shown in Table I were less than 10% in both stocks. Even after humid aging for one week (168 hrs.), the wires coated with this adhesive composition showed losses of only 11% in B- and ~24% in V-. This means that the bond between the phenolic resin coated bright steel wire and rubber is more durable (under humid aging) than the corresponding bond between brass-plated wire and rubber. In practical terms, it may mean that the tires reinforced with phenolic resin coated bright steel wire may last longer than the tires reinforced with the brass-plated wire.

Occasionally it is found that the adhesives that perform well in the pull-out adhesion test do not perform as well in the strip adhesion test. Wires dipped in two of the adhesive compositions shown in Table I were compared with the brass-plated wire in the strip adhesion test using B- rubber stock. The adhesion data are shown in Table II. The data show that the phenolic resin adhesives perform better than brass-plating in both unaged and humid aged strip adhesion test.

TABLE II

Effect of Phenol-Formaldehyde/Penacolite R-2170 Ratio On Strip Adhesion

| | | Strip Adhesion (kN/m)* at 25° C. | | |
|---|---|---|---|---|
| | | Phenol-Formaldehyde/Penacolite | | Brass-Plated |
| Stock | Humid Aging Conditions | 2:3 | 1:3 | (Control) |
| B- | None | 7.44 | 7.62 | 6.72 |
| B- | 121° C./N$_2$ + H$_2$O/72 hrs. | 2.80 | 4.55 | 2.35 |

*kN/m - kilo-Newtons/meter. One kN/m = 5.71 lbs/inch

The wires used in the above strip adhesion tests were also tested for hot (121° C.) adhesions using the wire pull-out test. The adhesions for the phenolic resin coated wires were 514 and 541 Newtons in V- and 541 and 571 Newtons in B-. The corresponding values for the brass-plated wire were 523 and 536 Newtons, respectively.

All wires (resin coated and brass-plated) showed high (>70%) rubber coverage in unaged tests (25° C. and 121° C.). In humid aging tests, however, the brass-plated wire showed little or no rubber whereas the resin coated wires still showed greater than 60% rubber coverage in the pull-out test and ~40% coverage in the strip adhesion test.

EFFECT OF PHENOL/FORMALDEHYDE RATIO

In order to study the effect of phenol/formaldehyde mole ratio on adhesion, four phenol-formaldehyde resins were prepared containing 1.5, 2.0, 2.5 and 3.0 moles of formaldehyde per mole of phenol. The catalyst level was 0.075 mole NaOH/mole of phenol. The recipes, reaction conditions, and some physical properties of these phenolformaldehyde resins are shown in Table III. These resins were then compounded with Penacolite R-2170 at two levels each.

TABLE III

Recipes, Preparation Conditions, And Physical Properties of Phenol-Formaldehyde Resins

| Resin | 1 | 2 | 3 | 4 |
|---|---|---|---|---|
| Recipe | | | | |
| Phenol (100%) | 95.0 | 95.0 | 95.0 | 95.0 |
| NaOH (50%) | 6.0 | 6.0 | 6.0 | 6.0 |
| Deionized water | 15.0 | 10.5 | 10.5 | 10.5 |
| Formaldehyde (37%) | 122.0 | 162.5 | 203.5 | 244.0 |
| Phenol/Formaldehyde/NaOH (moles) | 1/1.5/.075 | 1/2.0/.075 | 1/2.5/.075 | 1/3.0/.075 |
| Reaction Temperature, °C. | 80 | 80 | 80 | 80 |
| Reaction Time, hours | 1 | 1 | 1 | 1 |
| Physical Properties | | | | |
| TSC, % | 59 | 55 | 50 | 45 |
| pH | 9.10 | 8.95 | 8.80 | 8.75 |
| Free formaldehyde, *% | 0.83 | 2.25 | 4.51 | 8.14 |
| Brookfield Viscosity, cps (LVT #1, 60 rpm, 1 minute) | 20.0 | 21.5 | 20.0 | 17.5 |
| Water Tolerance, **% | 885 | 570 | 465 | 390 |

*Unreacted formaldehyde level of the resin mixture
**Defined as the weight percent of water that can be added to the initial resin solution before turbidity appears.

Table IV contains the adhesion data obtained with bright steel wire dipped in the above adhesives. The data show that although phenol-formaldehyde resins containing as little as 1.5 moles formaldehyde/mole phenol may be used in these adhesives, a mole ratio of between 2-3 moles formaldehyde/mole phenol is preferred. No advantage is expected from the use of phenol-formaldehyde resins containing more than three moles of formaldehyde/mole of phenol.

TABLE IV

Effect of Phenol/Formaldehyde Ratio On Adhesion

| Phenol/Formaldehyde (Mole Ratio) | Phenol-Formaldehyde/ Penacolite R-2170 | Stock | Adhesion (Newtons) at 25° C.; F-1615 Test Humid Aging Conditions | | |
|---|---|---|---|---|---|
| | | | None | 121° C./N2 + H2O/ 16 hrs. | 121° C./N2 + H2O/ 48 hrs. |
| 1:1.5 | 2:3 | V- | 821 | 774 | 694 |
| 1:1.5 | 1:3 | V- | 646 | 696 | 633 |
| 1:2.0 | 2:3 | V- | 866 | 749 | 700 |
| 1:2.0 | 1:3 | V- | 842 | 735 | 671 |
| 1:2.5 | 2:3 | V- | 758 | 791 | 740 |
| 1:2.5 | 1:3 | V- | 828 | 785 | 736 |
| 1:3.0 | 2:3 | V- | 857 | 785 | 718* |
| 1:3.0 | 1:3 | V- | 852 | 769 | 749 |

*The adhesion after humid aging for two weeks was 581 Newtons (on this wire).
See Table I for cord processing conditions and stock curing conditions.

EFFECT OF ATMOSPHERIC EXPOSURE OF DIPPED WIRE

Bright steel wires coated with a phenolic resin adhesive were placed on a rotating rack and exposed to the laboratory atmosphere for up to one week. The exposed wires were then tested in B- and V- rubber stocks to determine the effect of atmospheric exposure on adhesion. A brass-plated wire was used as a control. The adhesion data are given in Table V.

TABLE V

Effect of Atmospheric Exposure of Dipped Wire On Adhesion

| Phenol Formaldehyde/ Penacolite | | Adhesion (Newtons) at 25° C.; F-1615 Test | |
|---|---|---|---|
| Stock | Exposure Conditions | 1:3 | Brass-Plated (Control) |
| B-* | None | 719 | 556 |
| B-* | 25° C., 1 day | 693 | 543 |
| B-* | 25° C., 7 days | 724 | 620 |
| V- | None | 832 | 782 |

TABLE V-continued

Effect of Atmospheric Exposure of Dipped Wire On Adhesion

| Phenol Formaldehyde/ Penacolite | | Adhesion (Newtons) at 25° C.; F-1615 Test | |
|---|---|---|---|
| Stock | Exposure Conditions | 1:3 | Brass-Plated (Control) |
| V- | 25° C., 1 day | 824 | 731 |
| V- | 25° C., 7 days | 835 | 752 |

*A new batch of B- was used. This batch showed a faster curing rate than the previous batch and may be the reason for slightly lower adhesions (than normal) observed, especially for brass-plated wire. See Table I for particulars of phenol-formaldehyde resin, dip recipe, cord processing conditions, and stock curing conditions.

The data show that the exposure of adhesive treated wire to laboratory atmosphere for up to one week does not affect its adhesion to B- and V-rubber stocks. The same holds true for the brass-plated wire. The ability of the adhesive coated wire to withstand the normal atmospheric exposure without being affected in its subsequent adhesion to rubber is a very important practical consideration because the adhesive coated wires will often be stored for long (up to six months) periods before being used.

EFFECT OF PH (BASE LEVEL) OF DIP

Phenolic resin adhesives were prepared with a standard recipe and pH was adjusted at four different levels (between 7.85 and 10.50) with NaOH. Bright steel wire dipped in these adhesives was tested for adhesion to V-stock. The data showing the variation of adhesion with dip pH are given in Table VI. The data show that as the pH of the dip is increased from 7.85 to 10.50, the adhesive quality of the dip goes down gradually.

TABLE VI

Effect of pH (NaOH Level) of Dip On Adhesion

| Stock | Dip* pH Humid Aging Conditions | Adhesion (Newtons) at 25° C.; F-1615 Test | | | |
|---|---|---|---|---|---|
| | | 7.85 | 9.30 | 9.75 | 10.50 |
| V- | None | 702 | 698 | 490 | 281 |
| V- | 121° C./N$_2$ + H$_2$O/ 16 hrs. | 638 | 420 | 363 | 295 |

| Rubber coverage | 75% | 65% | 55% | 35% |

Stock Curing Conditions: 153° C., 35 minutes
See Table I for particulars of wire, dip recipe, and cord processing conditions.
*The phenol-formaldehyde resin used was prepared with the recipe of Table III. Phenol/formaldehyde/NaOH mole ratio was 1:3:.075. Reaction time of 7 days at 25° C. was used. The ratio of phenol-formaldehyde/Penacolite in the dip was 1:3.

Dip pH may affect the quality of the phenolic resin adhesives in a number of ways. It can cause increased reaction in the dip resulting in excessive molecular weight growth in the dip, overcuring of the adhesive on the cord thereby decreasing its reactivity towards the rubber stock, or overcurring of the rubber at the dip-rubber interface (due to increased basicity at this interface). The rubber coverage data given in Table VI show that as the dip pH increases, the rubber coverage on the corresponding cords decreases. The cords with the lowest rubber coverage (35% rubber coverage for a dip pH of 10.5) showed the presence of adhesive (on the cord) suggesting that the failure occurred at the dip-rubber interface. This may be due to the overcuring of the adhesive during the cord processing step and its subsequent reduced curability with the rubber stock.

The use of increased amounts of base in the dip may allow faster cord processing. However, with increasing base level, the reactions between phenolic resin molecules in the dip will also be accelerated. This will reduce the pot life of the dip. It was found that the dip with a pH of 10.5 showed some settling of materials within four hours after preparation.

EFFECT OF CORD PROCESSING CONDITIONS

A phenolic resin dip with phenol-formaldehyde/Penacolite R-2170 ratio of 1:3 was used to evaluate the effect of processing conditions (time and temperature in the oven) on adhesion of resin coated wires to rubber. The temperature in the oven was varied from 90°-225° C. and the processing times ranged between 15-180 seconds. Adhesion data are given in Table VII. The data show that the initial adhesion level is dependent on processing time and temperature. Even a processing time of 180 seconds at up to 135° C. gives low adhesions. At a processing temperature of 200°-225° C., a processing time of ~30 seconds may be sufficient to give good adhesions. Even faster processing speeds may be attainable at higher temperatures.

TABLE VII

Effect of Processing Conditions On Adhesion

| Cord Processing Temperatures* °C. | Processing Time (Seconds) | Adhesion (Newtons) at 25° C.; F-1615 Test Humid Aging Conditions | | |
|---|---|---|---|---|
| | | None | 121° C./N$_2$ + H$_2$O/ 16 hrs. | 121° C./N$_2$ + H$_2$O/ 168 hrs. |
| 90-95-100 | 60 | 557 | | |
| 90-95-100 | 120 | 538 | | |
| 90-95-100 | 180 | 549 | | |
| 110-120-135 | 60 | 544 | | |
| 110-120-135 | 120 | 548 | | |
| 110-120-135 | 180 | 655 | 718 | 538 |
| 135-150-175 | 15 | 544 | 475 | |
| 135-150-175 | 30 | 553 | 580 | |
| 135-150-175 | 60 | 818 | 815 | 524+ |
| 135-150-175 | 120 | 729 | 752 | 571 |
| 135-150-175 | 180 | 828 | 689 | 506+ |
| 150-170-195 | 15 | 503 | 524 | |
| 150-170-195 | 30 | 559 | 583 | |
| 150-170-195 | 60 | 777 | 768 | |
| 170-190-225 | 15 | 539 | 611 | |
| 170-190-225 | 30 | 772 | 811 | |
| 170-190-225 | 60 | 776 | 833 | |

*Temperatures reported represent the entrance, middle, and exit temperatures in the oven, respectively.
+ Some values in this test were low due to metal strip detachment during testing.

Stock Used: V-
See Table VI for particulars of dip recipe and stock curing conditions.

Further information was obtained on the effect of processing conditions on adhesion by looking at the mode of failure (or rubber coverage) on the tested wires. It was found that under processing conditions where initial (unaged) adhesion was less than 600 Newtons, the wires had little or no rubber coverage and the principal mode of failure appeared to be the cord-adhesive interface. At unaged adhesion levels of greater than 700 Newtons, the cords had a rubber coverage of ~70%. A mixed mode of failure (~50% rubber coverage) was observed for the sample with the unaged adhesion level of 655 Newtons. These observations suggest that at lower processing times and/or low processing temperatures the bond formation between the cord and adhesive had not attained its optimum level thereby resulting in low adhesions and failure at the cord-adhesive interface. At higher processing temperatures and/or times, the strength of the adhesive film, cord-adhesive interface, and the adhesive-rubber interface was apparently high enough so that the failure was primarily in the rubber phase. It is possible that if the processing temperatures and times are increased further, the adhesive film may become overcured and its curability with rubber may decrease. This will result in failure at the adhesive-rubber interface as was observed with the high pH dips (see Table VI).

It should also be kept in mind that as the processing time is decreased, the residence time of the cords in the dip also decreases. This may affect (perhaps to only a small extent) the deposition of the adhesive on the cords and the ultimate adhesions obtained.

WATER BASED DIPS

All the adhesion data reported so far has been for phenolic resin adhesives applied from n-propanol solutions. The application of these adhesives to steel wires from water-based solutions can be of considerable practical significance, especially from the point of view of environmental protection and solvent recovery. A few runs were therefore conducted to compare the performance of phenolic resin adhesives in application from water-based and n-propanol based solutions.

Penacolite R-2170 has only a limited water tolerance (dilutability) at the pH (0.5–1.5) at which it is sold. Water-based phenolic resin dips at phenol-formaldehyde/Penacolite ratio of 1:3 could not, therefore, be prepared (at 10% solids) without the addition of extra alkali to solubilize Penacolite R-2170. The pH of Penacolite R-2170 used in these experiments was adjusted to 7.5 (at 40% solids) with sodium hydroxide.

Dips were prepared by varying the water content from 15–90%, the rest being phenolic resins (10%) and n-propanol. The dip recipes and the adhesion data obtained with these dips are given in Table VIII. The data show that as the water content of the dip is increased from 15% to 90%, the adhesion values (especially the humid aged adhesions) gradually decrease. Other available data on 90% water content dips also show lower adhesions than those obtained with the corresponding n-propanol based (only ~15% water present) dips.

The data in Table VIII also show that the steel wires coated with the phenolic resin adhesives using the water-based dips perform better than the corresponding brass-plated wire in the humid aging tests. Even the water-based phenolic resin dips for bright steel wires may therefore be of commercial importance.

EFFECT OF CORD CONSTRUCTION

Two different construction wires (7×3×0.15 mm wire from Bekaert and 1×5×0.25 mm wire from Tokyo Steel Cord Co., Ltd.) were used in this study. Two adhesive dips, differing only in the pH of Penacolite R-2170 (3.5 and 7.5 at 40% solids) were prepared and applied to those cords. The adhesion data are given in Table IX.

TABLE IX

Effect of Cord Construction On Adhesion

| Stock | Wire Construction | Humid Aging Conditions | pH* of Penacolite R-2170 Adhesion (Newtons) at 25° C.; F-1615 Test 3.5 | 7.5 |
|---|---|---|---|---|
| V- | 7 × 3 × 0.15 mm (Bekaert) | None | 836 | 836 |
| V- | | 121° C./N$_2$ + H$_2$O/16 hrs. | 713 | 596 |
| V- | | 121° C./N$_2$ + H$_2$O/168 hrs. | 598 | 454 |
| V- | | 121° C./N$_2$ + H$_2$O/336 hrs. | 535 | 438 |
| V- | 1 × 5 × 0.25 mm (Tokyo Steel Cord) | None | 637 | 634 |
| V- | | 121° C./N$_2$ + H$_2$O/16 hrs. | 625 | 605 |
| V- | | 121° C./N$_2$ + H$_2$O/168 hrs. | 490 | 393 |
| V- | | 121° C./N$_2$ + H$_2$O/336 hrs. | 425 | 335 |

*pH of Penacolite R-2170 at 40% solids.
Phenol/formaldehyde/NaOH mole ratio was 1:3:0.075. The ratio of phenol-formaldehyde to Penacolite R-2170 in the dip was 1:3.
Cord Prcessing Conditions: 140°–155°–175° C. 2 minutes
Stock Curing Conditions: 153° C., 35 minutes The data in Table IX show that the initial and humid aged adhesions for 1×5×0.25 mm wire are lower than the corresponding adhesions for the 7×3×0.15 mm wire. This is entirely due to the difference in size (circumference) between the two wires. For each dip, the percent adhesion losses on humid aging are essentially identical under identical conditions. This shows that for those two wires, the performance of phenolic resin adhesives is independent of wire construction.

The data in Table IX also show that the adhesive prepared with the higher pH (7.5) Penacolite R-2170 gave lower humid aged adhesions than the adhesive prepared with the lower pH (3.5) Penacolite R-2170. This is consistent with the data in Table VI for the effect of pH on the performance of phenolic resin adhesives.

BRASS-PLATED, GALVANIZED AND BONDERIZED* STEEL WIRES

A standard phenolic resin dip with phenol-formaldehyde/Penacolite R-2170 ratio of 1:3 was used on brass-plated, galvanized and Bonderized steel wires. The wires were 7×3×0.15 mm construction and were obtained from Bekaert Steel Wire Corporation. The adhesion data are given in Table X. For the sake of comparison, adhesion data for corresponding undipped wires have also been included in Table X.

TABLE VIII

Effect of Water Content of the Dip On Adhesion

| Stock | Humid Aging Conditions | Total Water Content of Dip* Adhesion (Newtons) at 25° C.; F-1615 Test 90% | 80% | 70% | 15%+ | Brass-Plated (Control) |
|---|---|---|---|---|---|---|
| V- | None | 710 | 684 | 730 | 742 | 726 |
| V- | 121° C./N$_2$ + H$_2$O/16 hrs. | 377 | 454 | 475 | 544 | 198 |
| V- | 121° C./N$_2$ + H$_2$O/168 hrs. | 257 | 276 | 335 | 498 | — |

*The rest of the dip is phenolic resins (10%) + n-propanol.
+ All the water comes from the phenolic resins. No extra water is added.
The ratio of phenol-formaldehyde/Penacolite R-2170 in the dips was 1:3. The pH of Penacolite R-2170 (at 40%) was 7.5.
Cord Processing Conditions: 140°–155°–175° C., 2 minutes.
Stock Curing Conditions: 153° C., 35 minutes

*Bonderizing—the chemical treatment (or browning) of a clean steel surface with a solution of zinc phosphate along with alkali nitrates or nitrites.

TABLE X

Adhesion of Brass-Plated, Galvanized, Bonderized And Bright Steel Wires

| Stock | Type of Wire Humid Aging Conditions | Brass-Plated Dipped | Brass-Plated Undipped | Galvanized Dipped | Galvanized Undipped | Bonderized Dipped | Bonderized Undipped | Bright Dipped | Bright Undipped |
|---|---|---|---|---|---|---|---|---|---|
| V- | None | 491 | 726 | 751 | 70 | 727 | 53 | 777 | 55 |
| V- | 121° C./$N_2$ + $H_2O$/ 16 hrs. | 142 | 198 | 170 | — | 563 | — | 797 | — |

The phenol-formaldehyde/Penacolite R-2170 ratio of the dip was 1:3. n-propanol was used as the solvent. Cord processing and stock curing conditions are given in Table VIII.

The data show that the phenolic resin adhesive works best on the bright steel wire. It can also be used to great advantage on the Bonderized steel wires. For the galvanized wire, the phenolic resin adhesives shows a large improvement over the untreated wire in unaged adhesions but the humid aged adhesion is low. No benefit is shown by the adhesives when applied to the brass-plated wire.

Visual observations were made concerning the mode of failure during adhesion testing of various dipped wires. The Bonderized and the bright steel wires had ~60% rubber coverage in both the unaged and the humid aged tests. The galvanized wire showed ~60% rubber coverage in the unaged test. The brass wires in the same test showed ~40% rubber coverage and there was some evidence also of the adhesive coming off the cord. In the humid aged tests for both the galvanized and the brass-plated wires, failure appeared to be primarily at the cord-adhesive interface. There was some evidence also of the deterioration of the brass plating and the zinc plating in the humid aged tests.

EFFECT OF HI-SIL 215 AND COHEDUR RL IN RUBBER STOCK

In order to fully appreciate the scope and limitations of phenolic resin adhesives for the bonding of steel cords to rubber, it is important to identify the rubber stock ingredients that are responsible for the process of bond formation with the adhesive coated cords. Besides the usual rubber stock ingredients (such as carbon black, accelerators, antioxidants, sulfur, oil, etc.) both B- and V-rubber compounds also contain HiSil 215 (silica) and Cohedur RL (a form of resorcinol-formaldehyde resin defined earlier). Both of these materials are polar and are known to be quite compatible with the phenolic resins present in the adhesive. It was therefore speculated that these two ingredients may be important in determining adhesion between adhesive coated wire and B- and V-rubber stocks.

The recipe for V- rubber stock was used in these studies. Using this recipe, three stocks were prepared from which Hi-Sil 215, Cohedur RL, and both Hi-Sil 215 and Cohedur RL were omitted. The exact recipes for these stocks (along with that for the control) are given in Table XI. The Monsanto Rheometer data for these compounds have also been included in Table XI to give some relative idea about their properties and cure rates.

TABLE XI

Recipes For Rubber Stocks For The Effect Of HiSil 215 And Cohedur RL

| Stock V- | (Control) 1 | 2 | 3 | 4 |
|---|---|---|---|---|
| Ingredients | | | | |
| Natural rubber | 46.5 | 46.5 | 46.5 | 46.5 |
| Endor | 0.14 | 0.14 | 0.14 | 0.14 |
| SBR-1500 | 38.50 | 38.50 | 38.50 | 38.50 |
| Polybutadiene | 15.00 | 15.00 | 15.00 | 15.00 |
| FEF Black | 45.00 | 45.00 | 45.00 | 45.00 |
| HiSil 215 | 15.00 | — | 15.00 | — |
| BLE | 2.00 | 2.00 | 2.00 | 2.00 |
| Processing Oil | 5.00 | 5.00 | 5.00 | 5.00 |
| Zinc oxide | 3.00 | 3.00 | 3.00 | 3.00 |
| Stearic Acid | 1.50 | 1.50 | 1.50 | 1.50 |
| Cohedur RL | 4.70 | — | — | 4.70 |
| Santocure NS N-tert-butyl benzothiazole-2-sulfenamide | 1.20 | 1.20 | 1.20 | 1.20 |
| Crystex Sulfur | 3.00 | 3.00 | 3.00 | 3.00 |
| Monsanto Rheometer Data (153° C., 1°, 100 cpm) | | | | |
| Minimum Torque | 12.7 | 8.1 | 11.7 | 8.5 |
| Maximum Torque | 48.8 | 42.7 | 47.0 | 43.5 |
| 95% Cure Time (min.) | 28.5 | 14.0 | 18.5 | 18.0 |
| 100% Cure Time (min.) | 50.0 | 25.0 | 35.0 | 35.0 |
| 5 pt. Rise Time (min.) | 7.4 | 6.4 | 7.1 | 6.7 |

The adhesive used in this study had a 1:3 phenolformaldehyde/Penacolite R-2170 ratio. The adhesion data are given in Table XII.

TABLE XII

Effect of HiSil 215 And Cohedur RL On Adhesion

| Stock | Ingredients | Adhesion (Newtons) at 25° C.; F-1615 Test Humid Aging Conditions None | 121° C./$N_2$ + $H_2O$/16 hrs. | Rubber Coverage |
|---|---|---|---|---|
| 1 | V- (control) | 786 | 633 | 80% |
| 2 | V- minus (HiSil + Cohedur RL) | 359 | 375 | 15%* |
| 3** | V- minus Cohedur RL | 794 | 718 | 80% |
| 4 | V- minus HiSil | 633 | 549 | 80% |

The phenol-formaldehyde/Penacolite R-2170 ratio of the dip was 1:3.
Cord processing and stock curing conditions are given in Table VIII.
*Failure was primarily at the adhesive-rubber interface
**Subsequent adhesion tests showed lower values The data show that the rubber stock containing only HiSil 215 (no Cohedur RL) performed as well as the control which contained both HiSil 215 and Cohedur RL. The stock containing only Cohedur RL (no HiSil 215) gave ~20% lower unaged adhesion than the control. The rubber coverage for these three stocks was the same and was quite high (~80%). This suggests that the difference in adhesion between the control and the stock containing only Cohedur RL (no HiSil 215) is largely (if not entirely) due to the difference in the mechanical properties of these two stocks (Table XI). While no tensile propertiy data on these stocks are reported here, the Monsanto Rheometer data (Table XI) do suggest that the 300% modulus of the control stock is higher than that of the one containing only Cohedur RL (no HiSil 215). It may indeed be possible by adding more Cohedur RL (or even carbon black) to the stock to attain higher adhesion levels without the use of HiSil 215.

The unaged adhesion for the stock containing no HiSil 215 and Cohedur RL is only ~50% of the for the control. The difference in the tensile properties of this stock can only be partly responsible for this difference since the rubber coverage was only ~15%. The tested specimen showed that failure occurred primarily at the adhesive-rubber interface.

The above observations strongly suggest that in V-stock, both HiSil 215 and Cohedur RL act as bonding agents (besides their role in determining other properties of V-) with the phenolic resin adhesive layer. It is not known yet if this is due entirely to the polarity of these (HiSil and Cohedur RL) materials or if there are any specific interactions involved also.

PENACOLITE R-2170 AND FORMALDEHYDE ADHESIVE DIPS

The adhesion data reported in Table I show that as the percentage of Penacolite R-2170 in these adhesives is increased, humid aged adhesion retention imrovves. It was therefore naturally of great interest to determine the performance of an adhesive containing only Penacolite R-2170. However, since Penacolite R-2170 is nonheat reactive, the addition of a cross-linking agent was necessary and appropriate (phenol-formaldehyde resins in the earlier dips contain reactive phenolic species and also some free formaldehyde). Formaldehyde was therefore used as the cross-linking agent. Also Penacolite R-2170 at 40% solids has a pH of ~3.5. At this pH the reaction between Penacolite R-2170 and formaldehyde is very slow. To give reasonable reaction rates, the pH of Penacolite R-2170 was adjusted to 7.5 (at 40% solids).

The mole ratio of formaldehyde/resorcinol in Penacolite R-2170 is ~0.5:1.0. Dips were prepared by adding sufficient formaldehyde (to a solution of Penacolite R-2170 in n-propanol) to give final formaldehyde/resorcinol mole ratios of 0.5 (no additional formaldehyde added), 1.0, 1.5 and 2.0. This required the addition of 0, 12, 24 and 36 parts of formaldehyde per 100 parts (dry basis) of Penacolite R-2170, respectively. All dips were aged for one hour before use.

The dip recipes and the corresponding adhesion data are given in Table III.

TABLE XIII

Effect of Formaldehyde/Penacolite R-2170 Ratio On Adhesion

| Stock | Formaldehyde/Penacolite R-2170 Ratio* Humid Aging Conditions | Adhesion (Newtons) at 25° C.; F-1615 Test | | | |
|---|---|---|---|---|---|
| | | 0 | 12/100 | 24/100 | 36/100 |
| V- | None | 394 | 359 | 666 | 701 |
| V- | 121° C./N$_2$ +H$_2$O/16 hrs. | 448 | 385 | 507 | 533 |
| V- | 121° C./N$_2$ +H$_2$O/168 hrs. | 428 | 430 | 498 | 337+ |

*Refers to the amount of formaldehyde added to Penacolite R-2170 (by weight). The mole ratio of formaldehyde/resorcinol in these dips was 0.5, 1.0, 1.5 and 2.0, respectively. The pH of Penacolite R-2170 used was adjusted with NaOH to 7.5 (at 40% solids).
[30]This value is lower because of detachment of the metal backing strip from the test samples during testing.
All dips were 10% solids in n-propanol.
Cord processing and stock curing conditions are given in Table I.

The data show that as the formaldehyde/Penacolite R-2170 ratio of these dips is increased, the unaged adhesions increase gradually. The unaged adhesions for the dip containing 36 parts formaldehyde/100 parts Penacolite R-2170 is comparable to that of the corresponding brass-plated wire (~730 Newtons). The humid aged adhesions for all these dips are considerably higher than the corresponding values for the brass-plated wires.

It was shown in the data presented earlier (Table VI) that the dip pH affects the performance of phenolic resin adhesives. A number of Penacolite R-2170 and formaldehyde containing adhesives were prepared at formaldehyde/Penacolite R-2170 ratio of 0.36:1.0 (by weight). The pH of these dips was adjusted between 7.3 and 9.3. Bright steel wires dipped in these adhesives were tested for adhesion to V-stock. The adhesion data are given in Table XIV.

TABLE XIV

Effect of pH On The Adhesion of Penacolite R-2170 + Formaldehyde Dips

| Stock | Dip*, pH Humid Aging Conditions | Adhesion (Newtons) at 25° C.; F-1615 Test | | | | | |
|---|---|---|---|---|---|---|---|
| | | 7.3 | 7.7 | 8.45 | 8.75 | 9.10 | 9.30 |
| V- | None | 278 | 315 | 683 | 702 | 626 | 527 |
| V- | 121° C./N$_2$ + H$_2$O/16 hrs. | 443 | 478 | 651 | 618 | 554 | 321 |
| V- | 121° C./N$_2$ + H$_2$O/66 hrs. | 483 | 514 | — | — | — | — |
| V- | 121° C./N$_2$ + H$_2$O/168 hrs. | — | — | 582 | 560 | 459 | 346 |

*The formaldehyde/Penacolite R-2170 ratio of these dips was 0.36/1.0. All dips were aged four hours (at 25° C.) before use.
See Table VIII for cord processing and stock curing conditions.

The data in Table XIV show that as the pH of the dips is increased from 7.3 to 9.3, the unaged adhesion goes through a maximum at a pH between 8 and 9. Dips below pH 8 show low initial adhesions and low rubber coverage (~20%). The failure for the case of these two adhesives (pH of 7.3 and 7.7) is primarily in the adhesive film which probably is undercured. On humid aging (for up to 66 hrs.) the adhesion for the two dips increases while the rubber coverage remains essentially the same. This increase in adhesion on humid aging is at least partly due to further curing and strength development in the adhesive.

The dips with pH>9 show lower adhesions than the optimum, due probably to the overcuring of the adhesive which reduces its curability with the rubber stock. This is further confirmed by the humid aged test specimen which showed that the failure was largely at the adhesive-rubber interface.

The highest adhesions obtained with the Penacolite R-2170+formaldehyde dips (Tables XIII and XIV) are slightly lower (~10%) than the highest adhesions obtained with the phenol-formaldehyde+Penacolite R-2170 dips. The former dips, however, perform better than brass-plated wires in the humid aged test. The Penacolite R-2170+formaldehyde dips may be further optimized with respect to composition of reactant, dip aging time, and the cord processing condition. Other resorcinol-formaldehyde compounds may also be used in place of Penacolite R-2170.

OTHER PHENOLIC RESIN ADHESIVES

A few other commercial phenolic resins were also tried in adhesive dips for bright steel wire. The purpose of these experiments was merely to determine if some of these commercial resins may be used beneficially in this application. No attempts were made to optimize the adhesive dips based on these resins.

1. Phenol-Formaldehyde and H-7 Resin Dips

Adhesive dips were prepared containing various proportions of phenol-formaldehyde and H-7 resins. The solvent used was n-propanol. Since both these resins contain water, the water content of the dips ranged between 20–35%. The recipes and the adhesion data for these dips are given in Table XI. Since H-7 resin comes as a 20% solution in aqueous 3 N NH$_4$OH, all these dips contained varying amounts of ammonia also.

TABLE XV

| Phenol-Formaldehyde and H-7 Resin Adhesive Dips | | | | | | | | |
|---|---|---|---|---|---|---|---|---|
| Weight Ratio of Phenol-Formaldehyde/H-7 | 3/1 | | 1/1 | | ½ | | 0 | |
| % Water In Dip | 20 | | 25 | | 30 | | 35 | |
| Cord Processing Time* | 1 min. | 2 min. | 1 min. | 2 min. | 1 min. | 2 min. | 1 min. | 2 min. |
| Stock Humid Aging Conditions | Adhesion (Newtons) at 25° C.; F-1615 Test | | | | | | | |
| V- None | 832 | 859 | 820 | 808 | 765 | 688 | 306 | 296 |
| V- 121° C./N$_2$ + H$_2$O/16 hrs. | 569 | 564 | 530 | 523 | 616 | 588 | 353 | 342 |

*Oven temperatures were 140°-155°-175° C.
Stock Curing Conditions: 153° C./35 minutes
Tested samples showed ~70% rubber coverage for the first three dips and ~25% rubber coverage for the fourth dip.

The data in Table XV show that the dips containing phenol-formaldehyde and H-7 resins can be used to provide good adhesive performance for the bonding of bright steel wire to rubber. The loss on humid aging for these adhesive dips is somewhat higher than that for our best phenol-formaldehyde+Penacolite R-2170 adhesive. It is not clear if this is due to the presence of ammonia in the H-7 containing dips.

2. Arofene 7209, CKM-1634 and BKRA-2620 Adhesive Dips

These three resins are all heat-reactive phenolic resins sold in lump form. These materials are normally used as additives to rubber. Arofene 7209 is a resorcinol-formaldehyde resin, CKM-1634 is p(tert)butylphenolformaldehyde resin, and BKRA-2620 is a phenol-formaldehyde resin. The average molecular weight of these resins is higher than either Penacolite R-2170 or the phenol-formaldehyde resins prepared in our laboratory. These resins are not water soluble.

The resins were ground and dissolved in n-propanol. Resorcinol was added to two of the dips containing CKM-1634 and BKRA-2620. The dip recipes and the adhesion data are given in Table XVI.

TABLE XVI

| Adhesive Dips With Commercial Phenolic Resin | | | | | |
|---|---|---|---|---|---|
| Dip Composition* Resin/100 parts total | | | | | |
| Arofene 7209 | 10 | — | — | — | — |
| CKM-1634 | — | 10 | 7.5 | — | — |
| BKRA-2620 | — | — | — | 10 | 7.5 |
| Resorcinol | — | — | 2.5 | — | 2.5 |
| Stock Humid Aging Conditions | Adhesion (Newtons) at 25° C.; F-1615 Test | | | | |
| V- None | 374 | 143 | 156 | 626 | 701 |
| V- 121° C.; N$_2$ +H$_2$O /16 hrs. | 290 | 135 | 156 | 673 | 793 |

*n-propanol was used as solvent.
Cord Processing Conditions: 140°-155°-175° C., 2 minutes
Stock Curing Conditions: 153° C., 35 minutes The data in Table XVI show that the dip containing Arofene 7209 gave very low adhesions. Rubber coverage on the tested samples was ~20%.

Failure was primarily at the cord-adhesive interface and in the adhesive. This is probably due to the low reactivity of Arofene 7209.

The dips containing CKM-1634 resin (with or without resorcinol) also show very low adhesions (Table XVI) and the tested cords had 0% rubber coverage. The dipped cords in this case showed low dip pickup (visual observations). The failure was at the cord-adhesive interface. It is speculated that both low dip pickup and the mode of failure may be due to reduced polarity (due to the presence of tert-butyl group) and the reactivity of the resin.

The dips containing BKRA-2620 (with and without resorcinol) gave promising adhesion results, especially after humid aging (Table XVI). The rubber coverage on the unaged test samples was ~40% and after humid aging it was ~65%. The lower unaged adhesions may be due to undercuring of the adhesive on the cord. Further improvements in the adhesive quality of BKRA-2620 containing dips may be possible by the addition of more resorcinol, formaldehyde, or base to adjust pH to give desirable curing rates.

COMPARISON OF Z WIRE AND ADHESIVE COATED* BRIGHT STEEL WIRE

*Only the wires coated with the phenolic resin adhesive containing phenol-formaldehyde/Penacolite R-2170 (pH=3.5 at 40% solids) ratio of 1:3 were included in this comparison. The adhesive was applied from n-propanol. This composition was chosen for this comparison because of its superior performance compared to the other adhesion compositions studied. Cord processing conditions were 140°-155°-175° C., 2 minutes.

Z Wire is a brass-plated steel wire manufactured by Enka Glanzstoff, N.V. (Limeric). This wire is designed to give improved (compared to the normal brass-plated steel wire) adhesion retention during humid aging. This improvement is supposedly attained by modifying the brass plating.

The unaged and humid aged adhesions of Z wire (7×4×0.20 mm+0.15 mm wrap wire construction) to B- and V-stock were determined and the percent adhesion loss on aging was calculated for various humid aging conditions. The corresponding adhesion losses for the phenolic resin adhesive coated bright steel wires (7×3×0.15 mm, Bekaert) were also calculated from the data presented thus far. Since more than one set of data were available for the adhesive coated bright steel wires, each test was first treated separately to determine the respective adhesion losses. The adhesion losses obtained under identical conditions for the various sets of data were then averaged and the standard deviations were determined. The same was done with the adhesion data for the brass-plated Bekaert wire (7×3×0.15 mm construction).

The adhesion losses on humid aging for the various wires are reported in Table XVII. This method of comparison (i.e. percent adhesion losses) was chosen because the Z wire, due to its different construction than the other two wires, had a larger size (circumference and bonding area) and thus gave higher initial (unaged) adhesions. Direct comparison of adhesion values therefore would have been unfair and misleading.

normal handling involved in the storage, shipping and tire building operations. It has already been shown (Table IV) that the atmospheric exposure of phenolic resin adhesive coated cords for up to one week does not adversely affect their adhesion to rubber. In addition to atmospheric exposure, the adhesive coated cords may experience bending, etc., during normal handling procedures. It was therefore decided to study the effect of flexing the adhesive coated wire on its adhesion to rubber. The flexibility of the adhesive coating may also be important after the bonding of these (adhesive coated) cords to rubber. This area, however, was not explored in the present study.

There is no known standard flex test which may be used to simulate the conditions experienced by the wire during storage, shipping, and tire building operations. A very simple flex test devised in our own laboratory was therefore used.

The equipment used for this test consists basically of two vertically mounted metal plates, one of which is held relatively stationary (mounted with springs) while the other moves back and forth at a frequency of approximately 2,500 cycles per hour. The maximum separation between the far ends of the plates during the test

TABLE XVII

Comparison of Humid Aged Adhesion Losses For Various Wires

| Stock | Wire Specifications Humid Aging Conditions | Adhesive Coated Bright Steel (7 × 3 × 0.15 mm; Bekaert) | Brass Plated Z Wire (7 × 4 × .20 mm + 0.15 mm wrap) (Enka Glanzszoff) | Brass Plated (7 × 3 × 0.15 mm) (Bekaert) |
|---|---|---|---|---|
| V- | 121° C./$N_2$ + $H_2O$/ 16 hrs. | 6.2 ± 5.7 (12) | 21.8 | 66.3 ± 4.4 (1) |
| V- | 121° C./$N_2$ + $H_2O$/ 48 hrs. | 12.1 | — | 89.2 |
| V- | 121° C./$N_2$ + $H_2O$/ 168 hrs. | 23.8 ± 4.3 (7) | 76.8 | — |
| V- | 121° C./$N_2$ + $H_2O$/ 336 hrs. | 30.5 | — | — |
| B- | 121° C./$N_2$ + $H_2O$/ 16 hrs. | 8.0 ± 7.0 (2) | 9.4 | 53.5 × 1.5 (2) |
| B- | 121° C./$N_2$ + $H_2O$/ 48 hrs. | 9.4 | — | 68.8 |
| B- | 121° C./$N_2$ + $H_2O$/ 168 hrs. | 13.9 | 66.2 | — |

*(Average ± standard deviation). The number of tests is given in parenthesis. All others are averages of one test only.

The data in Table XVII show that the present adhesion loss on humid aging for 16 hours is considerably less for the Z wire than the corresponding values for the brass-plated Bekaert wires. This reduced adhesion loss from the former cannot be entirely (if at all) attributed to the difference in the cord construction for the two wires. The treatment given to the Z wire therefore does improve the humid aged adhesion retention over the ordinary brass-plated wire. After humid aging for 168 hours, however, even the Z wire shows adhesion loss of ∼66%, and ∼77% in B- and V-rubber stock, respectively. The Z wire tested after humid aging (in rubber) for 168 hours showed essentially no rubber coverage.

A comparison of the adhesive coated wire with the Z wire shows that the percent adhesion losses for the former (after humid aging for 168 hours) are much lower than those for the latter. The adhesive coated wire therefore performs considerably better than even the Z wire in humid aging tests.

FLEXING OF ADHESIVE COATED AND BRASS-PLATED STEEL WIRE

It is of utmost importance that the adhesive coating applied to the steel wire maintain its integrity during was 70 mm and the minimum separation was 12.5 mm (the plates are 6.25 mm thick).

The test procedure was as follows. Wires to be flex tested were cut to 180–200 mm lengths and taped to the far ends of the flexometer plates s3ch that the length of the wires between the taped portions was ∼75 mm each.

After flexing for the desired number of cycles (or time), the wires were removed from the flexometer and the central 15.9 mm (5/8") of each wire was embedded in V-rubber stock for adhesion testing in the manner described above. Since the center of the wire experiences the largest effect in this flex test, it is felt that this procedure for adhesion sample preparation will evaluate the maximum effect on adhesion for each set of flexing conditions.

The details of the flex test equipment and procedure are described earlier. In devising this test, the primary consideration was the availability of suitable equipment at the General Tire Research Center.

The adhesion data for the flexed and control (not flexed) adhesive coated and brass-plated steel wire are given in Table XVIII.

TABLE XVIII

Effect of Flexing* Of Adhesive Coated Wire On Adhesion

| Stock | Wire Specifications | No. of Flexes | Adhesion (Newtons) at 25° C.; F-1615 Test |
|---|---|---|---|
| V- | Adhesive Coated Bright Steel Wire+ (7 × 3 × 0.15 mm) (Bekaert) | None (control) 2500 5000 | 772≠ ± 15** 690≠ ± 30** 555 |
| V- | Brass-Plated Steel Wire (7 × 3 × 0.15 mm) (Bekaert) | None (control) 2500 | 707 718 |

*Flex Test described earlier
**Standard deviation
+The phenol-formaldehyde/Penacolite R-2170 ratio of the adhesive was 1:3.
≠Average of two tests
Stock Curing Conditions: 153° C., 35 minutes.

The data show that the adhesive coated wires does show a slight (10%) loss in adhesion when flexed for 2500 times. Further loss in adhesion for this cord is observed when flexed for 5000 times. The brass-plated wire on the other hand shows no adhesion loss when flexed 2500 times. The adhesion of adhesive coated wire flexed for 2500 times is, however, still equivalent to that of the brass-plated wire.

The flex data thus indicate that some adhesion loss may be expected for the phenolic resin adhesive coated wire during normal handling procedures although it is expected to be less than that given in Table XVIII for 2500 flex cycles.

The standard deviation for the adhesion value of the wires flexed for 2500 cycles suggests that the flex test gave good reproducibility.

MISCELLANEOUS

It was found that the phenolic resin adhesives may also be used for the bonding of stainless steel to rubber. This finding was somewhat accidental though not unexpected. As stated earlier, in the F-1615 wire pull-out test, the cords are embedded in rubber containing metal backing strips. These strips are made of stainless steel and are bonded to rubber with the help of a commercial adhesive (Thixon bonding agent, Whittaker Corporation). This adhesive is recommended for the bonding of rubber to metals. It was found that this adhesive did indeed work in bonding the stainless steel strips to B- and V-stock. On humid aging of adhesion samples for 168 hours or longer, however, the metal strips were often found to detach from rubber during wire pull-out tests. This reduced the rigidity of the assembly and gave erroneous adhesion results (see Tables I, VII and XII). It was found that if the stainless steel strips were coated with the phenolic adhesive of U.S. Pat. No. 4,040,999 (instead of the Thixon bonding agent), dried in air at room temperature and then used as backing strips, no detachment from rubber was observed when adhesion testing even after humid aging for two weeks. The phenolic resin adhesive thus worked better than the Thixon bonding agent (a commercial adhesive) in this application.

It is also important to mention here that the detachment of metal strips from rubber in the case of Thixon bonding agent occurred only when the adhesion between the wire and rubber was relatively high. This is quite expected since in any composite, the failure should occur at the weakest link. It was also noticed that when the metal strip did detach from rubber, the failure was at the metal strip-Thixon bonding agent interface.

Studies were also made on bright steel ribbon wire and stainless steel which confirmed that the practice of the present invention was equally applicable to such materials.

Any of the heat reactable phenolic formaldehyde resins which can be used in the coating can be added to the rubber.

Any fumed or precipitated silica can be used. High surface area silicas are preferred.

A tire was built using the phenol-formaldehyde of U.S. Pat. No. 4,040,999 and the processing went well. Tire tests have not yet been run.

We claim:

1. In a tire containing reinforcing elements having a bright steel surface bonded to a vulcanized rubber by a rubber-free adhesive composition wherein the vulcanized rubber contains from a small but effective amount to improve adhesion to 30 phr of a phenolic resin adhesion promoter and from a small but effective amount to improve adhesion to 60 phr of silica, the improvement characterized by the adhesive comprising a cured phenolic resin formed by the reaction of a phenol and formaldehyde wherein the resin in its uncured state is selected from the class consisting of heat reactive phenolic resin, and heat reactive phenolic resin in combination with non-heat reactive phenolic resin, wherein the ratio of the phenol to formaldehyde in the resin is from 1:1 to 1:6.

* * * * *